Figure 1:
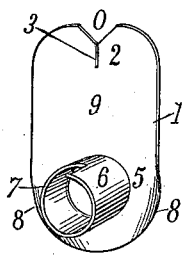
Figure 2:
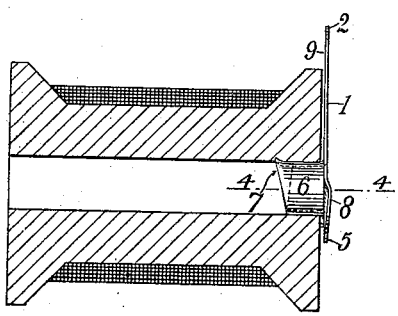
Figure 3:
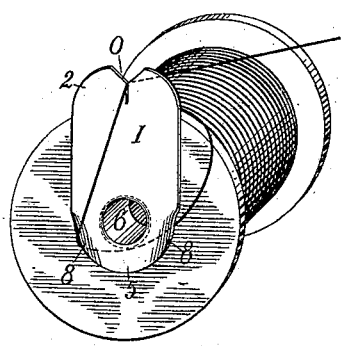
Figure 4:
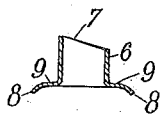

No. 649,180. Patented May 8, 1900.
W. ROBINSON.
SPOOL ATTACHMENT.
(Application filed Feb. 27, 1900.)
(No Model.)

Witnesses:

Inventor
Wade Robinson

UNITED STATES PATENT OFFICE.

WADE ROBINSON, OF NEW YORK, N. Y.

SPOOL ATTACHMENT.

SPECIFICATION forming part of Letters Patent No. 649,180, dated May 8, 1900.

Application filed February 27, 1900. Serial No. 6,716. (No model.)

*To all whom it may concern:*

Be it known that I, WADE ROBINSON, a citizen of the United States, residing at No. 12 East One Hundred and Thirty-first street, in the city of New York, county and State of New York, have invented a certain new and useful Improvement in Spool Attachments, of which the following is a specification.

My invention relates to that class of spool attachments by means of which a portion of a thread wound upon a spool after being unwound therefrom may be severed and the loose end of the remaining portion fastened to the spool; and the objects of my invention are to provide a means whereby a portion of a thread wound upon a spool may, after being unwound therefrom, be severed and the loose end of the portion remaining wound upon the spool fastened to prevent the accidental unwinding of such remaining portion and that shall be simple, effective, durable, inexpensive in construction, and capable of service on either of a number of spools of various sizes. I attain these objects by the means hereinafter described, and illustrated in the accompanying drawings, in which—

Figure I is a perspective view of the attachment. Fig. II is a side view of the same attached to a spool, the spool being shown in section. Fig. III is a perspective view of the same attached to a spool; and Fig. IV is a sectional view of the same, taken on the line 4 4 in Fig. II.

My invention is constructed of a metal plate 1, rounded on its ends and provided on its upper end 2 with a cutting notch or slit 3. Said cutting notch or slit 3 is formed of a cut or incision, the entrance or beginning of which is widened by cutting away the adjacent metal, as shown at $o$ in Figs. I and III, and means for attaching said plate 1 to a spool. Said means of attachment is formed by drawing a portion of the lower end 5 of the metal plate 1 into an extension 6 of a tubular form and extending in a direction substantially at right angles with said plate 1, the free end of the said tubular extension 6 being spirally cut and the edge of the said free end outwardly turned to form the screw-thread 7, substantially as shown in Figs. I and II. Portions of the opposite edges of the lower end 5 of the metal plate 1 are bent outward slightly in a direction away from the spool to form the lips 8 8, substantially as shown in Figs. II and IV.

The metal plate 1 is of dimensions sufficient to permit its upper end 2 to project beyond the edge or periphery of the head of the spool and not prevent the free use of the cutting notch or slit 3, substantially as illustrated in Figs. II and III. The cutting notch or slit 3 is provided for the purpose of severing thread. The tubular extension 6 is of such dimensions and the screw-thread 7, with which the said tubular extension 6 is provided, is so constructed as to permit the free entrance of the said tubular extension 6 into the bore of the spool by turning in the manner usual with screw-threads and bring and maintain the inner face 9 of the metal plate 1 in close contact with the head of the spool, substantially as illustrated in Fig. II.

To sever a portion of thread from a spool provided with my attachment and securely fasten the loose end of the remaining portion, the portion desired to be severed is carried around the projecting end 2 of the metal plate 1 on that side of the projecting end 2 that is farthest in the direction in which the thread is wound and thence downwardly and across the head of the spool. The thread is then forcibly inserted between the inner face 9 and the head of the spool, substantially as illustrated in Fig. III. The outwardly-turned lips 8 8 are provided to facilitate the insertion of the thread between the inner face 9 of the metal plate 1 and the head of the spool. By reason of the close contact of the inner face 9 of the metal plate 1 and the head of the spool the forcible insertion of the thread between them operates to wedge and securely fasten and hold the thread. When the thread has thus been wedged and fastened, the remaining loose portion is carried in a direction around the tubular extension 6 and upward and is then forced downward and into the cutting notch or slit 3. The friction thus caused between the sides of the cutting notch or slit 3 and the thread operates to sever the thread at a point which will leave a short free end to the thread that may be readily grasped when it is desired to remove a further portion. The entrance or beginning of the cutting-slit 3 is widened, as shown at $o$ in Figs. I and III, for the purpose of guiding the thread into the cutting-slit 3.

The construction and form of my device as herein described and illustrated are substantially as shown, but may be varied, its requisites being a plate of dimensions sufficient to permit it to project beyond the edge or periphery of the head of the spool for which it is intended, a cutting notch or slit conveniently located, means for attaching and maintaining the said plate removably or permanently in close contact with the head of a spool, and means for fastening a thread between one face of the plate and the head of the spool to which the said plate may be attached.

The bores of spools in general use being of substantially-uniform diameter and the diameter of spools varying with the coarseness and quantity of the thread wound upon them, it will be seen that if my attachment be constructed of a size suitable for a spool of large diameter it may be used with equal facility on either of a number of spools of lesser size.

From the foregoing description and the accompanying drawings it will also be seen that my invention may be used with equal facility upon a spool of thread whichever may be the direction in which the thread is wound.

What I claim as my invention is—

1. A spool attachment for severing and fastening thread, comprising a plate of dimensions sufficient to permit it to project beyond the periphery of the head of a spool, a cutting-slit conveniently located in said plate, means for attaching said plate to a spool, and means for fastening a thread between the said plate and the head of said spool, substantially as set forth.

2. A spool attachment for severing and fastening thread, comprising a plate of dimensions sufficient to permit it to project beyond the periphery of the head of a spool, a cutting-slit conveniently located in said plate, suitable means for attaching and maintaining said plate in close contact with the head of said spool, and means for facilitating the insertion of a thread between the said plate and the head of said spool, substantially as set forth.

3. A spool attachment for severing and fastening thread, comprising a plate of dimensions sufficient to permit it to project beyond the periphery of the head of a spool, a cutting-slit conveniently located in said plate, means for fastening a thread between said plate and the head of said spool, and means for attaching said plate to said spool, said means of attachment being constructed in tubular form and provided with a screw-thread, substantially as set forth.

4. A spool attachment for severing and fastening thread, comprising a plate of dimensions sufficient to permit it to project beyond the periphery of the head of a spool, means for severing a thread, said means for severing being located in said plate, means for attaching said plate to a spool, and means for fastening a thread between said plate and the head of said spool, substantially as set forth.

WADE ROBINSON.

Witnesses:
M. LAWSON DYER,
BENJAMIN MILLER.